(12) United States Patent
Tanaka et al.

(10) Patent No.: US 12,229,221 B2
(45) Date of Patent: Feb. 18, 2025

(54) RECORDING MEDIUM DETERMINATION APPARATUS AND METHOD OF DETERMINING TYPE OF RECORDING MEDIUM

(71) Applicant: CANON KABUSHIKI KAISHA, Tokyo (JP)

(72) Inventors: Shu Tanaka, Tokyo (JP); Naohiro Hosokawa, Kanagawa (JP); Takuhiro Ogushi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 542 days.

(21) Appl. No.: 17/512,087

(22) Filed: Oct. 27, 2021

(65) Prior Publication Data

US 2022/0138507 A1    May 5, 2022

(30) Foreign Application Priority Data

Oct. 29, 2020  (JP) ................. 2020-181047
Aug. 13, 2021  (JP) ................. 2021-132029

(51) Int. Cl.
  *G06F 18/24* (2023.01)
  *G06F 18/21* (2023.01)
  *G06V 10/40* (2022.01)
  *G06V 10/94* (2022.01)

(52) U.S. Cl.
  CPC .............. *G06F 18/24* (2023.01); *G06F 18/21* (2023.01); *G06V 10/40* (2022.01); *G06V 10/95* (2022.01)

(58) Field of Classification Search
  CPC ......... G06F 18/24; G06F 18/21; G06V 10/40; H04N 1/00724
  See application file for complete search history.

(56) References Cited

U.S. PATENT DOCUMENTS

| | | | |
|---|---|---|---|
| 2009/0041340 A1* | 2/2009 | Suzuki | G06T 7/00 382/159 |
| 2015/0162372 A1* | 6/2015 | Yorimoto | H01L 27/14643 250/208.1 |
| 2016/0031250 A1* | 2/2016 | Yokozawa | G01N 21/251 347/19 |

FOREIGN PATENT DOCUMENTS

| | | | |
|---|---|---|---|
| JP | 2006292952 A | 10/2006 | |
| JP | 2020118741 A | * | 8/2020 |

* cited by examiner

*Primary Examiner* — Bobbak Safaipour
*Assistant Examiner* — Ashley L. Hytrek
(74) *Attorney, Agent, or Firm* — Canon U.S.A., Inc. IP Division (57) ABSTRACT

A recording medium determination apparatus includes an image data acquisition unit configured to acquire image data obtained by capturing an image of a predetermined area in a recording medium, a first extraction unit configured to extract a first feature amount by processing the image data using a first parameter, a second extraction unit configured to extract a second feature amount by processing the image data using a second parameter different from the first parameter, and a determination unit configured to determine a type of the recording medium based on the first feature amount and the second feature amount.

10 Claims, 11 Drawing Sheets

RECORDING MEDIUM DETERMINATION APPARATUS AND METHOD OF DETERMINING TYPE OF RECORDING MEDIUM

BACKGROUND

Field of the Disclosure

The present disclosure relates to a recording medium determination apparatus and a method of determining a type of a recording medium.

Description of the Related Art

Some known recording apparatuses can record images on various recording media, such as glossy paper, semi-glossy paper, and matte paper. In these recording apparatuses, parameters corresponding to features of the recording media are set in some cases in order to perform optimum recording for each type of recording medium.

In a case where a user sets a type of a recording medium, the user may set a wrong type of recording medium. If a type of recording medium having significantly different features is erroneously set, an image may be affected by, for example, a change in an injection amount of ink.

According to Japanese Patent Application Laid-Open No. 2006-292952, a technique is discussed in which a group of recording media is determined using images of the recording media captured under a first image capturing condition, and a type of the captured recording medium is determined from the group using an image captured under a second image capturing condition based on the determined group.

However, the technique according to Japanese Patent Application Laid-Open No. 2006-292952 needs to perform image capturing twice and thus takes time for determination.

SUMMARY

The present disclosure is directed to reduction of time taken to determine a recording medium in consideration of the above-described issue.

According to an aspect of the present disclosure, a recording medium determination apparatus includes an image data acquisition unit configured to acquire image data obtained by capturing an image of a predetermined area in a recording medium, a first extraction unit configured to extract a first feature amount by processing the image data using a first parameter, a second extraction unit configured to extract a second feature amount by processing the image data using a second parameter different from the first parameter, and a determination unit configured to determine a type of the recording medium based on the first feature amount and the second feature amount.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings. The exemplary embodiments which will be described below are not intended to limit the present disclosure according to the claims. A plurality of features of the present disclosure is described in the exemplary embodiments, but all of the plurality of features are not always essential to the means for solution according to the present disclosure and can be freely combined. Further, the same or similar components are denoted by the same reference numerals throughout the attached drawings, and repeated description thereof will be omitted.

(System Configuration)

Figure 1:
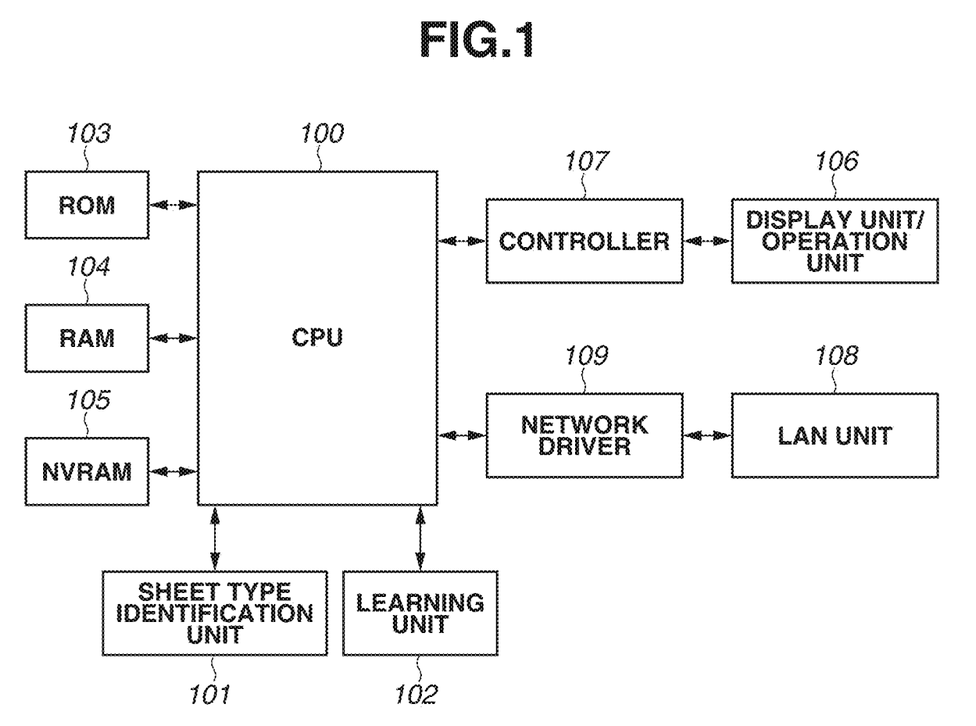
FIG. 1 is a block diagram illustrating an example of a system configuration according to an exemplary embodiment.
Figure 2:
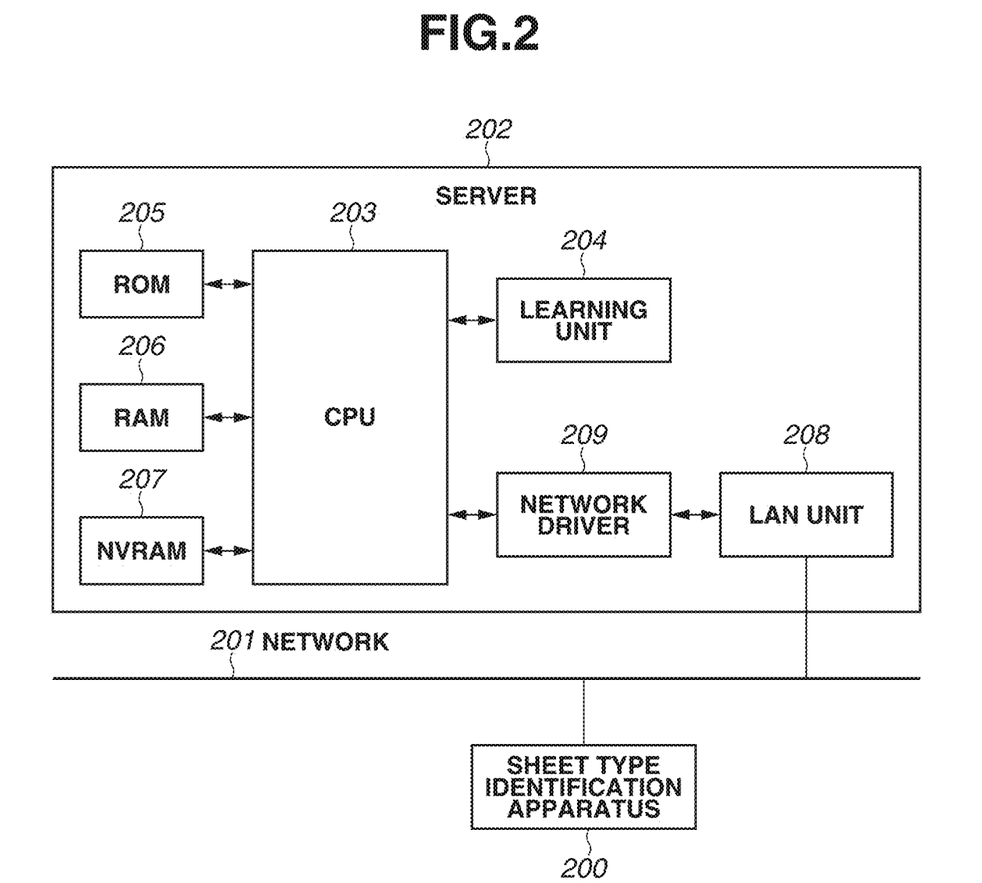
FIG. 2 is a block diagram illustrating an example of a system configuration according to the present exemplary embodiment.

An example of a system configuration according to the present exemplary embodiment will be described with reference to FIGS. 1 and 2. In the present exemplary embodiment, machine learning is executed to identify a sheet type, and identification of the sheet type is executed using a trained estimation model acquired through the machine learning. As an example of a system configuration for executing such processing, FIG. 1 illustrates an example in which machine learning and identification of a sheet type are executed by a single apparatus, and FIG. 2 illustrates an example in which machine learning and identification of a sheet type are shared and executed by a plurality of apparatuses. A medium the type of which is to be determined may be a recording medium not limited to paper, and may be, for example, a cloth and a vinyl chloride sheet. In the following description, a medium the type of which is to be determined is a sheet of paper as an example.

A configuration of an apparatus in the system configuration in FIG. 1 will be described. In the following description, while this apparatus is referred to as a sheet type identification apparatus (recording medium determination apparatus) for convenience sake, the apparatus may be configured to be able to execute processing other than identification of a sheet type. According to the present exemplary embodiment, the sheet type identification apparatus is provided, for example, inside a recording apparatus. The sheet type identification apparatus identifies a type of a sheet based on a feature amount regarding the sheet measured using a sensor unit included in a sheet conveyance mechanism of the recording apparatus as described below. The sheet type identification apparatus includes, for example, a central processing unit (CPU) 100, a sheet type identification unit 101, a learning unit 102, a read only memory (ROM) 103, a random access memory (RAM) 104, a non-volatile RAM (NVRAM) 105, a display unit/operation unit 106, a controller 107, a local area network (LAN) unit 108, and a network driver 109. Further, the sheet type identification apparatus may be provided separately from the recording apparatus as an apparatus capable of communicating with the recording apparatus. The sensor unit may be provided in the sheet type identification apparatus.

The sheet type identification apparatus executes various types of control processing, such as control of an entire apparatus and control of sheet type identification processing by, for example, the CPU 100 executing a program stored in the ROM 103 or the like. At this time, the RAM 104 can be used as, for example, a work memory in the control. Data to be retained in a case where a power supply of the sheet type identification apparatus is turned off is stored in the NVRAM 105 which is a non-volatile RAM. The sheet type identification apparatus controls the sheet type identification unit 101 and the learning unit 102 by executing a control program stored in the ROM 103 with the CPU 100. In this case, the RAM 104 stores, for example, data of a measurement result of a sheet as a temporary record. The NVRAM 105 stores records of various types of data to be used for maintenance of the sheet type identification apparatus and information about a sheet for identifying a sheet type. The sheet type identification unit 101 executes sheet type identification processing and identifies the sheet type based on the data of the measurement result of the sheet. The learning unit 102 executes machine learning to acquire a trained estimation model to be used for the sheet type identification processing. Operations of the sheet type identification unit 101 and the learning unit 102 will be described below.

The sheet type identification apparatus causes, for example, the display unit/operation unit 106 to display information on a screen and to receive a user operation. The information may be presented not only by screen display but also by various interfaces using, for example, sound and vibration. The user operation is received via a hardware device, such as a keyboard, a pointing device, and a touch pad. The display unit/operation unit 106 may be implemented by separated hardware devices, such as a display and a keyboard or may be implemented by a single hardware device, such as a touch panel. The controller 107 converts, for example, information output by the CPU 100 to a format available for the display unit/operation unit 106 to generate information which is presentable for a user and outputs the resultant to the display unit/operation unit 106. The controller 107 converts the user operation received by the display unit/operation unit 106 to a format which can be processed by the CPU 100 and outputs the resultant to the CPU 100. An execution operation and a setting operation of each function of the sheet type identification apparatus are executed via, for example, the display unit/operation unit 106 and the controller 107.

The sheet type identification apparatus is connected to the network via, for example, the LAN unit 108 and communicates with another apparatus. The network driver 109 extracts data to be handled by the CPU 100 from signals received via the LAN unit 108 and converts data output from the CPU 100 to a format for transmitting to the network. The LAN unit 108 may include an interface, such as a socket and a circuit for signal processing for wired communication, such as Ethernet. The LAN unit 108 may also include an antenna and a circuit for signal processing for wireless communication, such as a wireless LAN conforming to the Institute of Electrical and Electronics Engineers (IEEE) 802.11 standard series. The sheet type identification apparatus may include a communication unit for public wireless communication and short-range wireless communication instead of the LAN unit 108. In a case where the sheet type identification apparatus is operated via a remote user interface, the obtaining of a control command and a setting value are obtained, output of a processing result thereof can be performed via the LAN unit 108 and the network driver 109 for the sheet type identification apparatus.

FIG. 2 illustrates an example of the system configuration in a case where the learning unit 102 is arranged on the outside of the sheet type identification apparatus. In the example in FIG. 2, the system includes a sheet type identification apparatus 200 and a server 202. The sheet type identification apparatus 200 is connected to the server 202 via a network 201, acquires a trained estimation model which is a result of machine learning in a learning unit 204 in the server 202, and executes sheet type identification processing using the trained estimation model. The server 202 may be a processing apparatus configured with a general purpose computer including, for example, a CPU 203, a ROM 205, a RAM 206, and a NVRAM 207. The server 202 controls machine learning processing in the learning unit 204 by, for example, the CPU 203 executing a program stored in the ROM 205. The server 202 may include a graphics processing unit (GPU) and control the machine learning processing in the learning unit 204 using the GPU. Since the GPU can efficiently perform calculation by processing more data in parallel, it is effective to perform processing by using the GPU in a case where learning is performed for a plurality of times using a learning model such as deep learning. Specifically, in a case where a learning program including a learning model is executed, the CPU 203 and the GPU perform calculation in cooperation with each other to perform learning. Regarding the processing in the learning unit 204, the calculation may be performed only by the GPU. An estimation unit and the learning unit 406 to be described with reference to FIG. 5 may also use the GPU, as in the learning unit 204. The RAM 206 stores data used in the learning as a temporary record in control execution performed by the server 202. The NVRAM 207 stores records of various types of data necessary to generate the trained estimation model and information about the sheet for identifying the sheet type. The server 202 can include a LAN unit 208 for connecting to an external apparatus, such as the sheet type identification apparatus 200. The LAN unit 208 and a network driver 209 which is arranged between the LAN unit 208 and the CPU 203 are equivalent to the LAN unit 108 and the network driver 109 in FIG. 1. The following exemplary embodiment will be described using the system configuration in FIG. 1 as an example.

Figure 3:
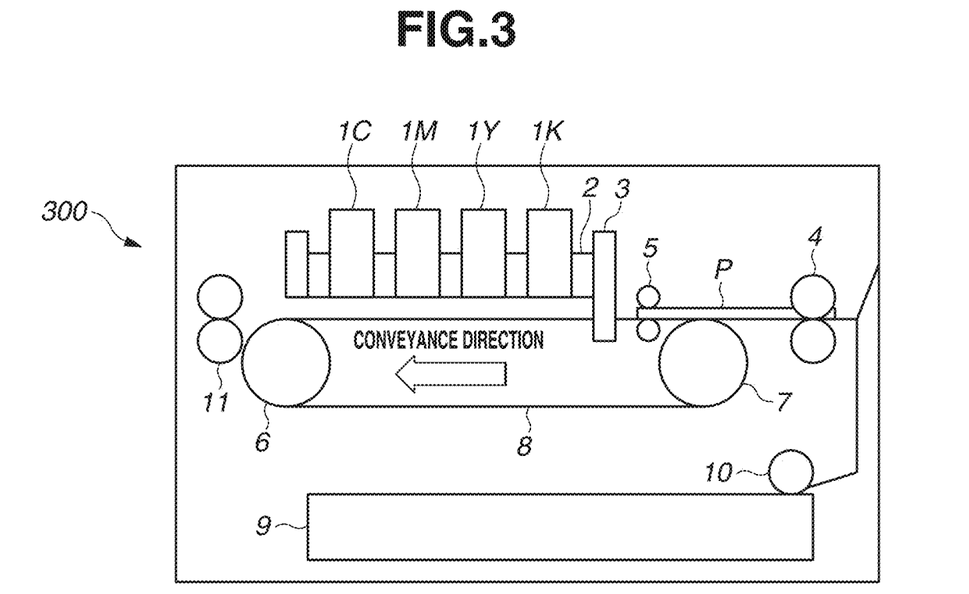
FIG. 3 is a configuration diagram schematically illustrating an internal configuration of a recording apparatus according to the present exemplary embodiment.

FIG. 3 is a configuration diagram schematically illustrating an internal configuration of the recording apparatus according to the exemplary embodiment.

A recording apparatus 300 illustrated in FIG. 3 is provided with a cassette sheet feeding unit 9 and a manual tray sheet feeding unit (not illustrated) and performs recording on a sheet fed from either one of the sheet feeding units. For example, in a case where a sheet P is fed from the cassette sheet feeding unit 9, the sheet P is fed and conveyed by a pick-up roller 10. If the sheet P is conveyed to a position of a pair of nip rollers 4, the pair of nip rollers 4 rotates, and the sheet P is conveyed along a conveyance direction (the left direction in the drawing).

The sheet P is pinched by a conveyance belt 8 and a pair of nip rollers 5 and is conveyed in the conveyance direction along with a movement of the conveyance belt 8. The sheet P conveyed along with the conveyance belt 8 is conveyed to a recording start position of an inkjet type recording head 1 (1C, 1M, 1Y, 1K).

The conveyance belt 8 extends in a tensioned state around a drive roller 6 and a driven roller 7. In the recording apparatus 300, a position at which the sheet P is nipped by the pair of nip rollers 5 is regarded as the recording start position, and a recording timing of the recording head 1 is controlled with a position of the drive roller 6 as a reference, so that an image is recorded at a predetermined position on the recording medium. If the recording is completed, the sheet P is discharged through a pair of discharge rollers 11.

The recording head 1 includes a line head of each color aligned along the conveyance direction and is attached to a recording head unit 2. Line heads 1C, 1M, 1Y, and 1K respectively eject a cyan ink, a magenta ink, a yellow ink, and a black ink. Each of the line heads 1C to 1K is supplied with the ink via a tube from an ink tank (not illustrated) which independently stores the ink of each color.

The line head of each color may be formed of a single nozzle tip or divided nozzle tips that are arranged in a line or regularly arranged in a staggered arrangement. According to the present exemplary embodiment, the line head will be described as a full multi (line) head with nozzles aligned in a range which covers a width of a recording area of a maximum size sheet which can be used in the recording apparatus 300.

The recording apparatus 300 includes a sensor unit 3 provided with an image capturing unit which captures an image of a print surface, on an upstream side of the recording head unit 2.

Figure 4:
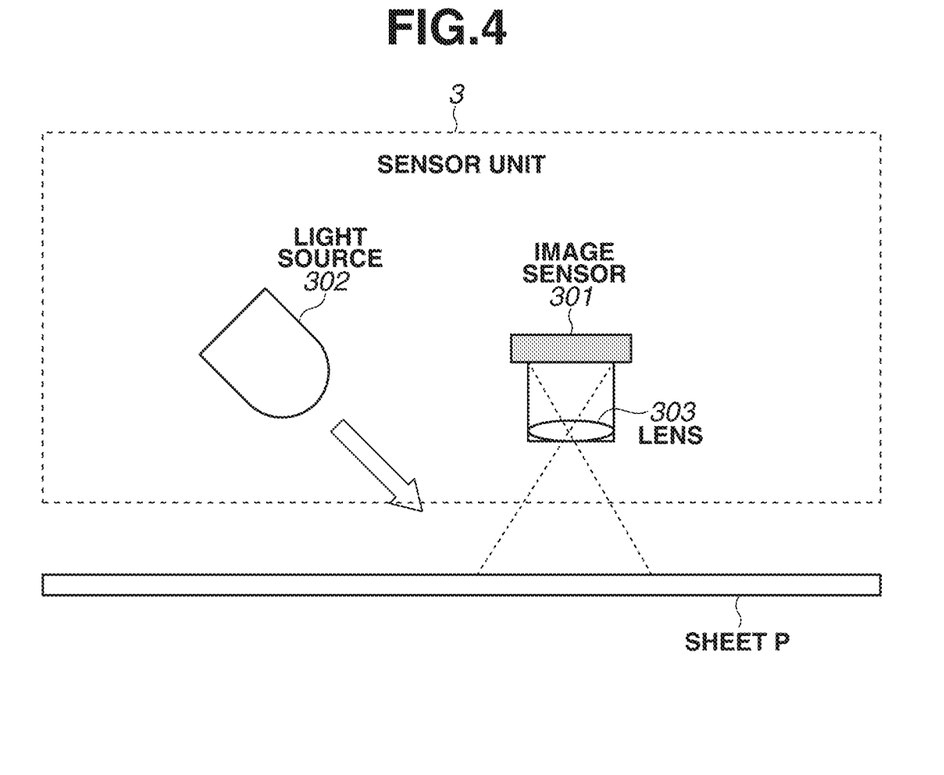
FIG. 4 illustrates an example of a sensor unit according to the exemplary embodiment.

FIG. 4 illustrates an example of the sensor unit 3.

The sensor unit 3 includes an image sensor 301, a light source 302, and a lens 303.

The image sensor 301 can use a line sensor in which light receiving elements are arranged in one dimension or an area sensor in which light receiving elements are arranged in two dimensions. As a light receiving element, a charge coupled device (CCD), a complementary metal oxide semiconductor (CMOS), and the like can be used as a sensor.

The light source 302 can be one using a light-emitting diode (LED) and/or a laser. The light source 302 is not limited to these as long as it can irradiate the sheet P with light. The lens 303 collects reflected light of light incident on the sheet P.

The light source 302 irradiates a print surface of the sheet P with light, and the image sensor 301 captures the reflected light thereof for a certain period of time. The image sensor 301 forms an image on the light irradiated surface of the sheet P based on the received light and converts the formed image into image data. Here, the configuration has been described in which the image sensor 301 captures the reflected light of the light source 302 as an example, but a configuration may be adopted in which the light source 302 is arranged on a non-print surface side of the sheet P, and the image sensor 301 captures transmitted light. In this manner, the image sensor 301 acquires image data obtained by capturing an image of a predetermined area on the print surface of the sheet P.

A feature of a print surface of a sheet can be acquired by the above-described configuration. According to the present exemplary embodiment, image data is acquired by capturing an image of a print surface, but image data may be acquired by capturing an image of a non-print surface.

(Machine Learning)

Figure 5:
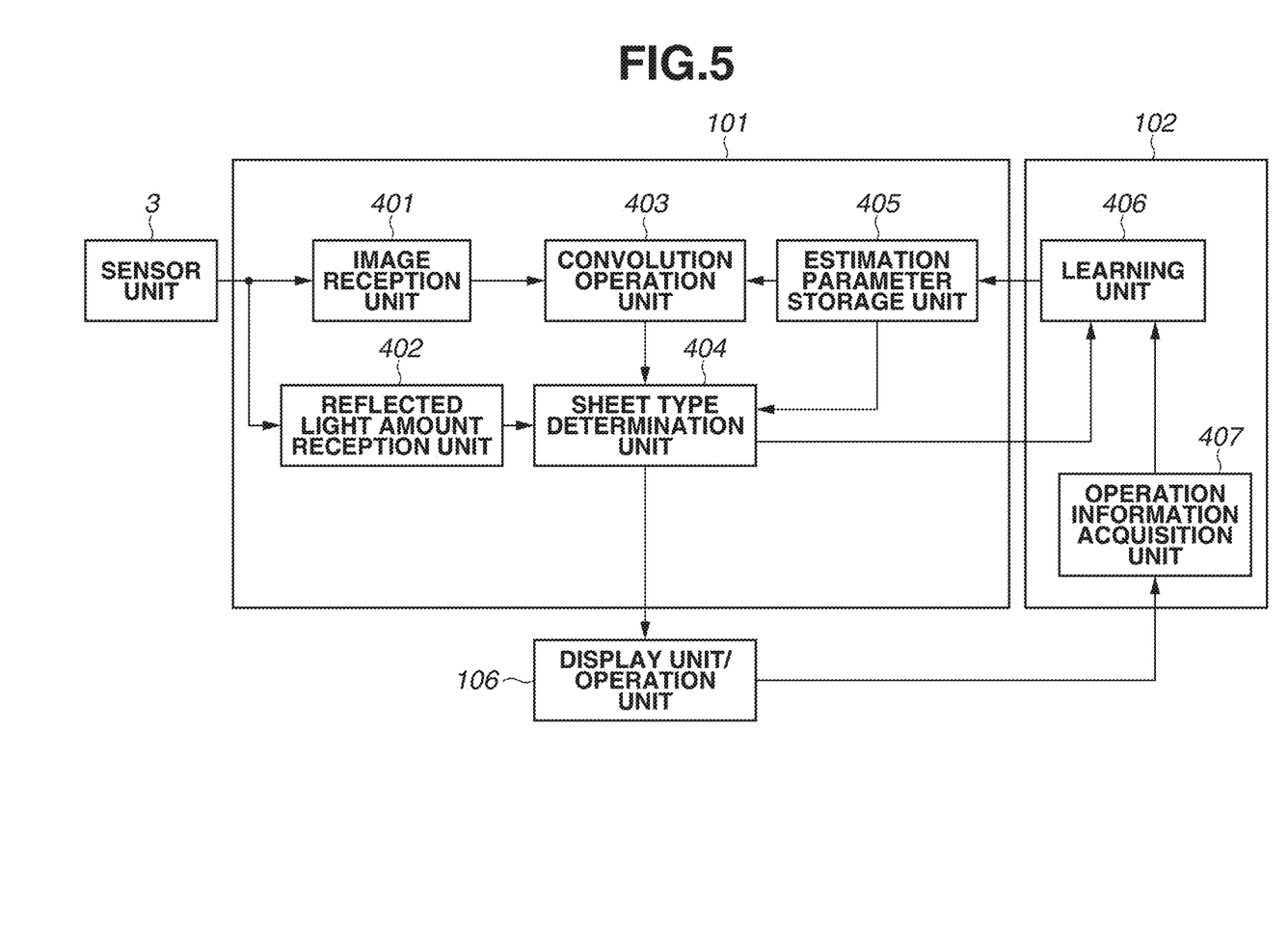
FIG. 5 is a block diagram illustrating an example of a functional configuration according to the present exemplary embodiment.

According to the present exemplary embodiment, sheet type identification processing is executed using an estimation parameter acquired in advance by machine learning described below. An example of a functional configuration related to the sheet type identification processing will be described with reference to FIG. 5. Each processing unit in FIG. 5 is configured to be able to communicate with each other and is connected to each other by a bus or the like. The sheet type identification unit 101 includes an image reception unit 401, a reflected light amount reception unit 402, a convolution operation unit 403, a sheet type determination unit 404, and an estimation parameter storage unit 405, which will be described below. The learning unit 102 includes a learning unit 406 and operation information acquisition unit 407, which will be described below.

An image reception unit 401 functions as an image data acquisition unit which acquires data of an image captured using the image sensor 301 of the sensor unit 3. The reflected light amount reception unit 402 receives an amount of light that is reflected from a sheet and is received by the sensor unit 3. The reflected light amount increases as a degree of whiteness of the sheet increases and the surface roughness of a sheet decreases, for example.

A convolution operation unit 403 extracts feature amount, such as an amount of asperities, an interval of asperities, and depths of asperities of the sheet from the image data acquired by the image reception unit 401 using a parameter stored in the estimation parameter storage unit 405. The feature amounts extracted by the convolution operation unit 403 are input to the sheet type determination unit (a recording medium determination unit) 404 to determine the sheet type. Here, the parameter is used for the convolution operation unit 403 to perform image processing. Examples of the parameter include a filter coefficient and bias.

Information about the determined sheet type is displayed on the display unit/operation unit 106. A user makes a final confirmation or setting of the sheet type using a user interface (UI) of the display unit/operation unit 106. The operation information acquisition unit 407 acquires operation information from the display unit/operation unit 106.

The learning unit 406 updates the parameters, such as the filter coefficient and the bias, used by the convolution operation unit 403 based on the sheet type estimated by the sheet type determination unit 404 and the operation information acquired by the operation information acquisition unit 407 and stores the updated parameters in the estimation parameter storage unit 405.

Figure 6:
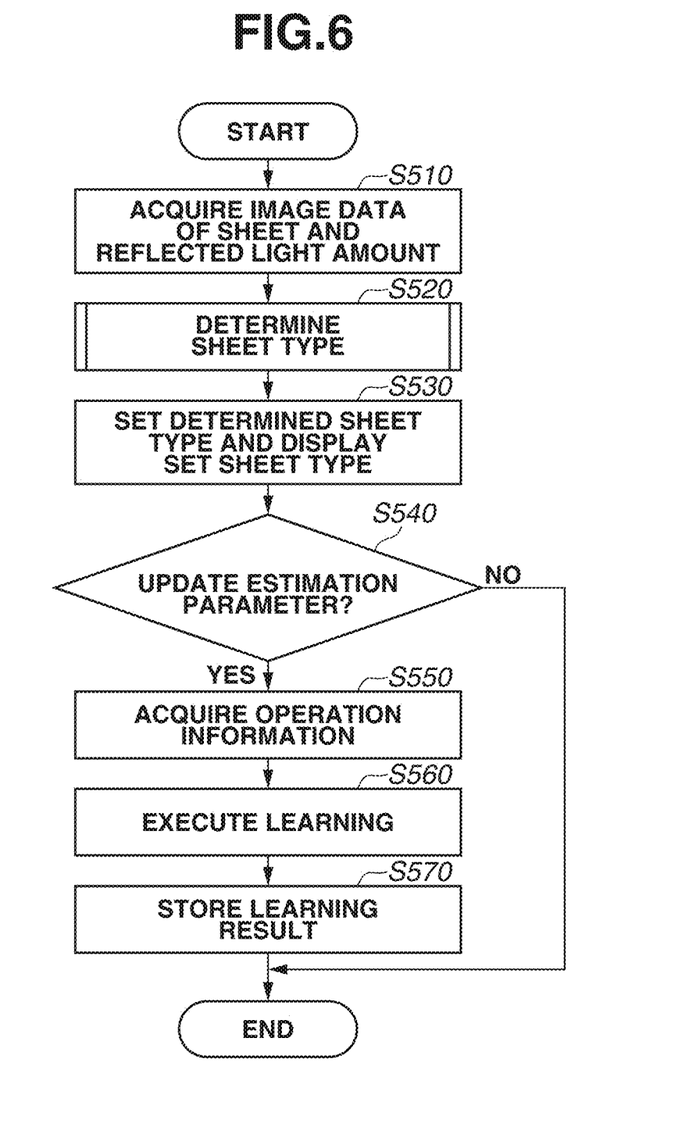
FIG. 6 is a flowchart illustrating determination processing of a sheet type according to the present exemplary embodiment.

FIG. 6 is a flowchart illustrating determination processing of determining the sheet type performed by the sheet type identification unit 101 according to the present exemplary embodiment. This processing is executed by the CPU 100 controlling each configuration in accordance with a program stored in the ROM 103. The processing is started by a user setting a sheet to the recording apparatus 300 and instructing the recording apparatus 300 to feed the set sheet. If sheet feeding is instructed, the sheet is conveyed by each roller and belt as described in conjunction with FIG. 3.

In step S510, if the sheet is conveyed to a position facing the sensor unit 3, the sensor unit 3 acquires image data on the print surface and the reflected light amount.

In step S520, the sheet type is determined based on the image data acquired in step S510. A probability of the measured sheet type being each sheet type is calculated through the determination. The determination of the sheet type will be described in detail below with reference to FIG. 7.

In step S530, the sheet type with the highest probability in determination results in step S520 is set to the sheet type to be used and displayed on the display unit/operation unit 106. If the displayed sheet type is appropriate, the user inputs so that the sheet type currently displayed on the display unit/operation unit 106 is set. On the other hand, in a case where the user wants to set a type different from the currently displayed sheet type, the user can change the sheet type to be set from the display unit/operation unit 106. In a case where the sheet type set in a print driver and the determination result is different, the setting of the print driver is changed to the sheet type with the highest probability among the sheet types for which determination is made in step S520. Instead of automatically changing the print driver setting, the sheet type to be set may be changed only in a case where the user is asked for confirmation of whether to change the sheet type on the UI and permits the change.

In step S540, it is determined whether to update the estimation parameter. The user can set whether to update the estimation parameter, in other words, whether to execute relearning using the results obtained in steps S510 to S530 in advance from the display unit/operation unit 106. If learning execution is set to NO (NO in step S540), the sheet type determination processing is terminated.

If the learning execution is set to YES (YES in step S540), the processing proceeds to step S550. In step S550, the operation information acquisition unit 407 acquires the type of the recording medium that the user has finally selected.

In step S560, the learning unit 406 performs learning using the finally set sheet type and the result determined by the sheet type determination unit 404 as input data and updates the estimation parameter. In step S570, the updated result is stored in the estimation parameter storage unit 405. The estimation parameter is updated by calculating an error gradient of each parameter of the convolution operation unit 403 and the sheet type determination unit 404 by a known backpropagation based on an error between the probability output by the sheet type determination unit 404 and a target output stored in advance in the ROM 103.

As described above, the sheet type determination processing in FIG. 6 is terminated. Subsequently, parameters related to a recording operation, such as a conveyance amount and an ejection amount of ink, in performing recording corresponding to the type of the recording medium determined in the determination processing are set. In step S530, only one sheet type having the highest probability is displayed, but a plurality of sheet types may be displayed for the user to select. As a method for selecting a plurality of sheet types, a predetermined number of sheet types may be displayed in descending order of the probability, or the sheet types with a predetermined probability or higher may be displayed. In the above-described processing, the sheet type is displayed on the display unit/operation unit 106. However, for example, in a case of an apparatus including a loudspeaker and a microphone, the sheet type may be notified by outputting a name of the sheet type from the loudspeaker, and a user may input the sheet type to be selected from the microphone.

Figure 7:
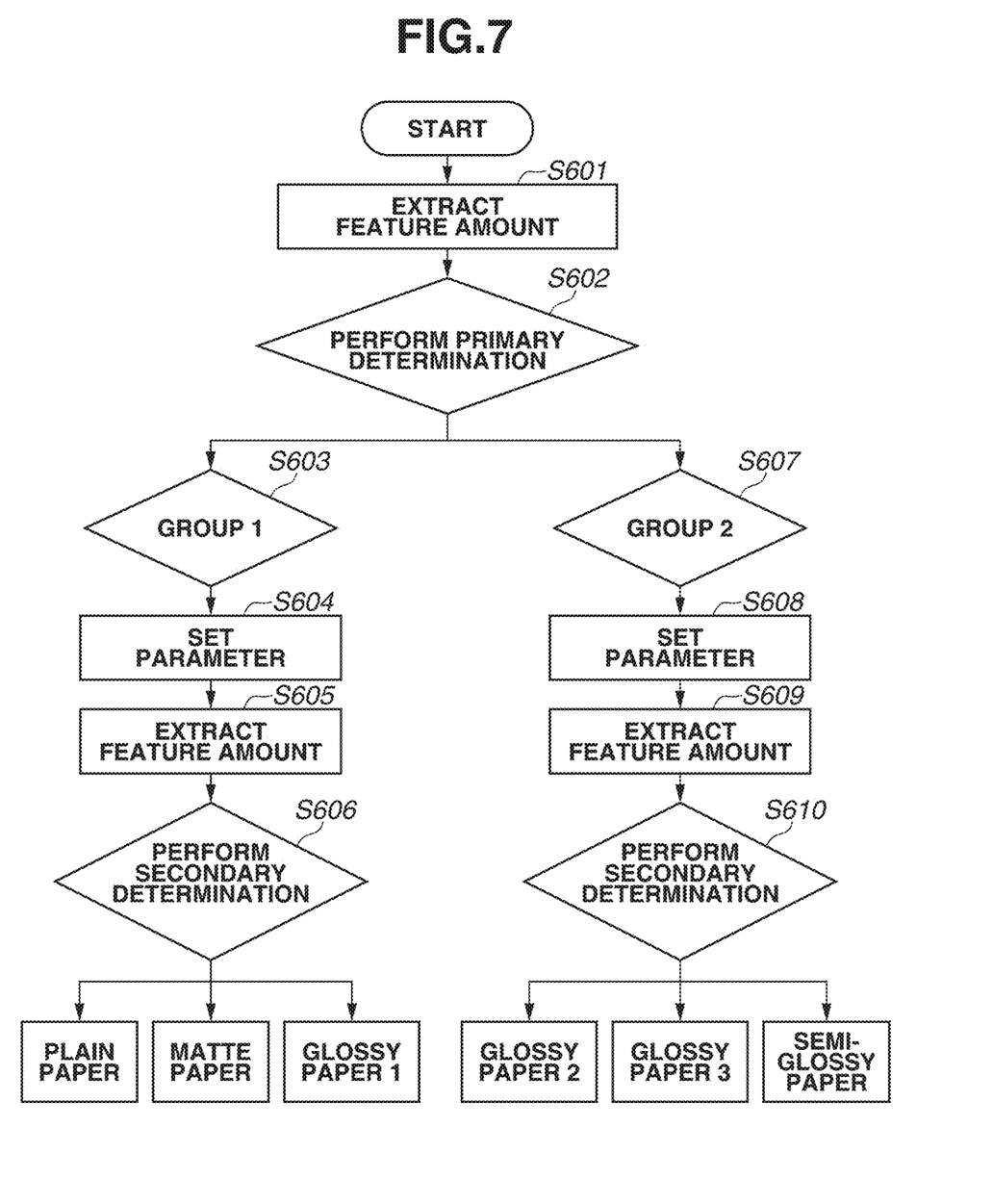
FIG. 7 is a flowchart illustrating processing of determining a sheet type according to the present exemplary embodiment.

Next, the processing in step S520 in FIG. 6 will be described with reference to FIG. 7.

First, in step S601, the convolution operation unit 403 extracts the feature amount from the image data acquired in step S510. In step S602, the extracted feature amount is input to the sheet type determination unit 404, and the sheet type determination unit 404 performs primary determination for determining whether the sheet from which the image data is acquired belongs to a group 1 or a group 2. In step S602, the parameters of the convolution operation unit 403 and the sheet type determination unit 404 are set to the parameters that are stored in the estimation parameter storage unit 405 in correspondence with determination of the group. A method for generating a parameter will be described below.

According to the present exemplary embodiment, the sheet type is determined from among plain paper, matte paper, glossy paper 1 (Canon Photo Paper, glossy standard, manufactured by Canon), glossy paper 2 (Canon Photo Paper, glossy gold, manufactured by Canon), glossy paper 3 (Canon Photo Paper, platinum grade, manufactured by Canon), and semi-glossy paper. Further, according to the present exemplary embodiment, the plain paper, the matte paper, and the glossy paper 1 belong to the group 1, and the glossy paper 2, the glossy paper 3, and the semi-glossy paper belong to the group 2. Sheets having similar features are set in the same group. According to the present exemplary embodiment, sheets having similar asperities are treated in the same group in order to extract information about the asperities of the sheet as the feature amount, which will be described below with reference to FIG. 9. Here, the sheets having many asperities are classified into the group 1, and the sheets flatter than those in the group 1 are classified into the group 2.

Figure 8:
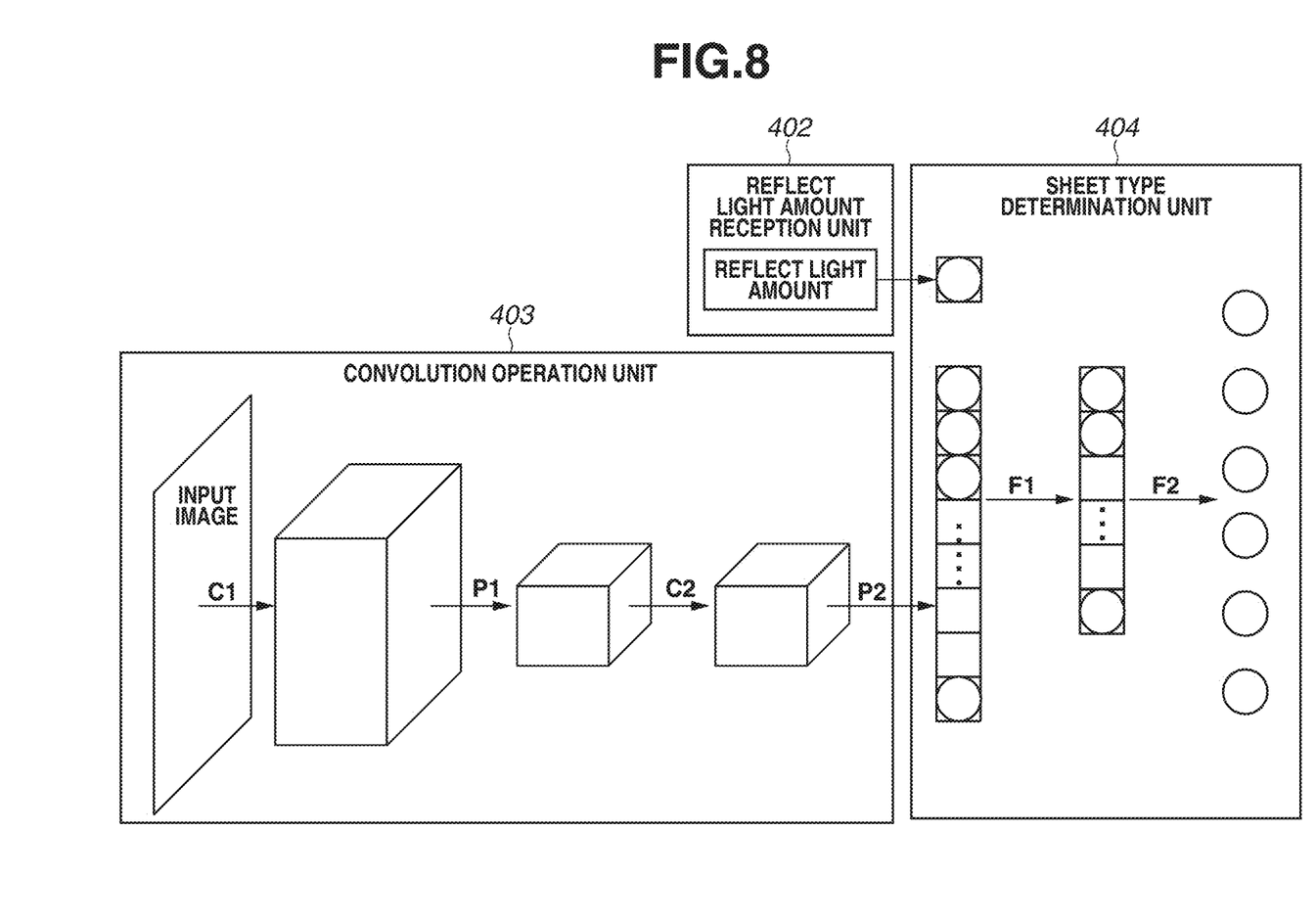
FIG. 8 illustrates a configuration of a convolution operation unit and a sheet type determination unit according to the present exemplary embodiment.

The convolution operation unit 403 and the sheet type determination unit 404 are configured as illustrated in FIG. 8. The convolution operation unit 403 includes convolutional layers C1 and C2 and pooling layers P1 and P2 and executes feature extraction of the input image data. The sheet type determination unit 404 includes fully connected neural networks F1 and F2, receives an input of an operation result of operation processing performed by the convolution operation unit 403, and outputs the probability of being each type of the recording medium. Global average pooling (GAP) and the like can be used for a neural network.

Figure 9:
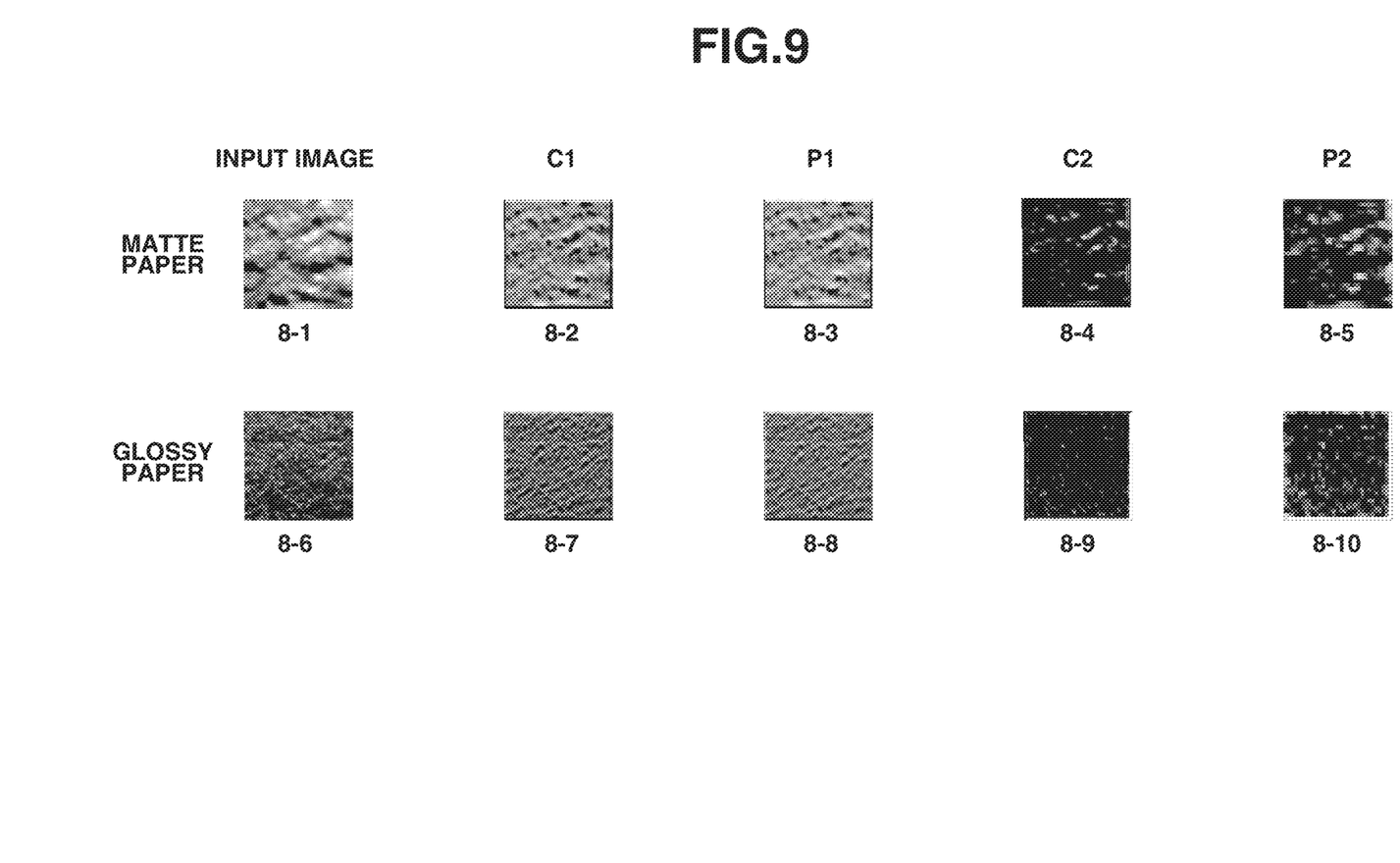
FIG. 9 illustrates examples of input images and output images in a case where image data is input according to the present exemplary embodiment.

FIG. 9 illustrates a part of input images and a part of output images of the respective layers, namely, the convolutional layers C1 and C2 and the pooling layers P1 and P2 in a case where the image data of each of the matte paper and the glossy paper is input to the convolution operation unit 403.

Images 8-1 to 8-5 represent a part of the input image of the matte paper and the output images of the respective layers in the convolution operation unit 403 with respect to the input. The images 8-2 and 8-4 represent convolution operation results in which the feature amounts, such as an amount of asperities, an interval of asperities, and depths of asperities of the sheet are extracted.

The images 8-3 and 8-5 have been subjected to the max pooling in which only a pixel having a maximum value is extracted from neighboring pixels, and thus a portion from which the feature amount is extracted is emphasized even if the image becomes rough.

Images 8-6 to 8-10 represent a part of the input image of the glossy paper and the output images of the respective layers in the convolution operation unit 403 with respect to the input. In the images, the feature amounts, such as depths and widths of the asperities, are extracted even from the glossy paper having fewer asperities.

A method of learning and an example of learning conditions will be described below.

Initially, an example of the learning conditions will be described. A learning update rate is 0.0001, a filter size of the convolutional layer C1 is (10×10), the number of filters of the convolutional layer C1 is 30, a filter size of the convolutional layer C2 is (5×5), the number of filters of the convolutional layer C2 is 30, and a pooling size of each of the pooling layers P1 and P2 is (2×2). A pooling method is the max pooling, and the number of intermediate layers in the fully connected layers is 800. These conditions are values which are set empirically to some extent and are determined by trial and error while changing the parameters until determination accuracy reaches a target. As an example, according to the present exemplary embodiment, the filter size of 5×5 is adopted to the convolutional layer C2 based on relative comparison of results of the filter sizes of 3×3, 5×5, and 10×10.

Next, the method of learning will be described. For the primary determination in step S602, 500 images for each of all sheets from which the sheet type is to be determined (or identified) (the plain paper, the matte paper, the glossy paper 1, the glossy paper 2, the glossy paper 3, and the semi-glossy paper) are prepared and each labeled with a correct answer, and learning is performed. The labels of correct answers are the group 1 for the plain paper, the matte paper, and the glossy paper 1 and the group 2 for the glossy paper 2, the glossy paper 3, and the semi-glossy paper. After the learning, the determination accuracy is verified using 100 images of each sheet for verification. In a case where the acquired determination accuracy does not reach the target, the foregoing learning conditions are changed and the learning is performed again. For secondary determination in step S606, 500 images for the respective sheets from which the sheet type is to be determined (the plain paper, the matte paper, and the glossy paper 1) are prepared and each labeled with a correct answer, and learning is performed. After the learning, the determination accuracy is verified using 100 images of each sheet for verification. Similarly, for the secondary determination in step S610, 500 images for the respective sheets from which the sheet type is to be determined (the glossy paper 2, the glossy paper 3, and the semi-glossy paper) are prepared and each labeled with a correct answer, and learning is performed. After the learning, the determination accuracy is verified using 100 images of each sheet for verification.

The parameter of the convolutional layer acquired as a learning result will be described as an example. Since main spatial frequencies (roughness of the asperities on the sheet surface) are different between the group 1 and the group 2, the parameter of the convolutional layer is set to a value learned so as to form a filter suitable for the spatial frequency of each group.

If the result of the primary determination in step S602 is the group 1, the processing proceeds to step S603, and in step S604, the estimation parameters of the convolution operation unit 403 and the sheet type determination unit 404 are set. In step S604, the estimation parameters stored in the estimation parameter storage unit 405 corresponding to the group 1 are set.

Next, in step S605, a convolution operation is executed on the image data acquired in step S510 using the estimation parameters set in step S604 to extract the feature amount.

In step S606, the feature amount extracted in step S605 is input to the sheet type determination unit 404, and the secondary determination is made to determine which sheet the measured sheet is in the group 1. This determines a detailed type of the recording medium.

If the result of the primary determination in step S602 is the group 2, the processing proceeds to step S607, and in step S608, the estimation parameters of the convolution operation unit 403 and the sheet type determination unit 404 are set. In step S608, the estimation parameters stored in the estimation parameter storage unit 405 corresponding to the group 2 are set.

Next, in step S609, the convolution operation is executed on the image data acquired in step S510 using the estimation parameters set in step S608 to extract the feature amount.

In step S610, the feature amount extracted in step S609 is input to the sheet type determination unit 404, and the secondary determination is performed to determine which sheet the measured sheet is in the group 2. This determines a detailed type of the recording medium.

As described above, the feature amounts are extracted from the same image data using the different estimation parameters, and thus the type of the recording medium can be determined not only roughly but also in detail, such as whether the measured sheet is the glossy paper 2 or the glossy paper 3, without performing imaging for a plurality of times while changing the conditions.

In FIG. 6, the processing of uniquely determining (identifying) a sheet type through two times of determinations has been described. However, the determination may be performed for a larger number of times depending on a sheet type to be a determination target and the number of types to be determined. The processing will be described below with reference to FIG. 11.

Figure 11:
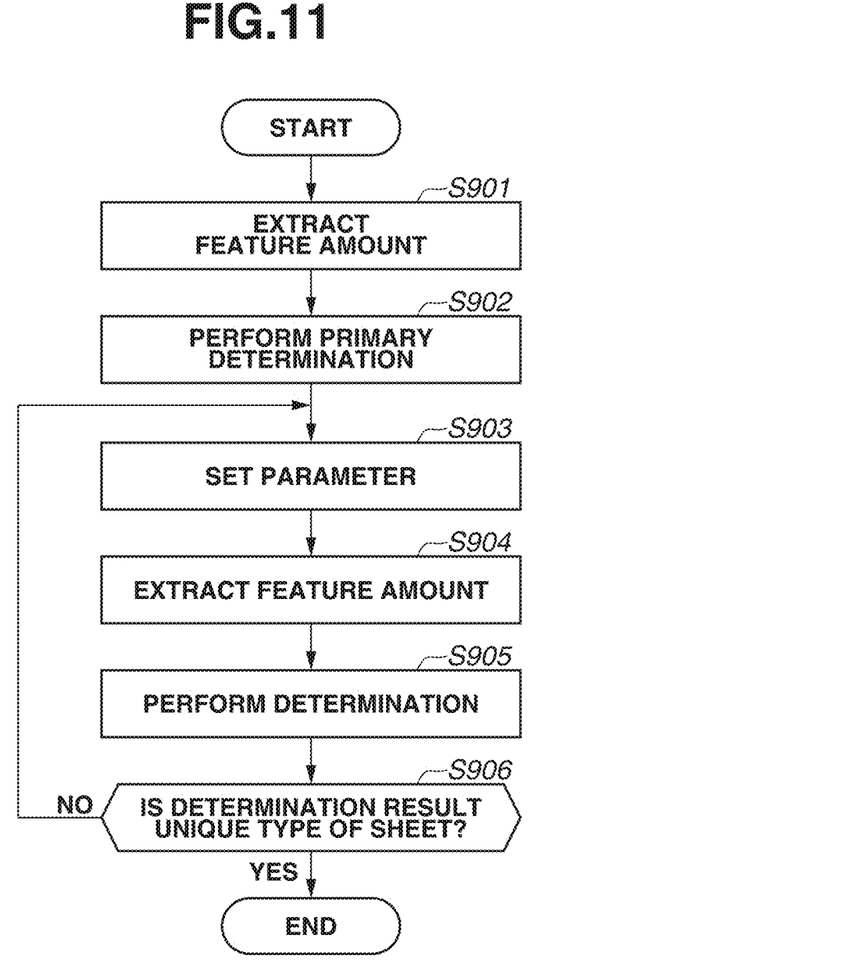
FIG. 11 is a flowchart illustrating processing of determining a sheet type according to the present exemplary embodiment.

In step S901 in FIG. 11, the convolution operation unit 403 extracts the feature amount from the image data acquired in step S510, as in step S601. In step S902, the extracted feature amount is input to the sheet type determination unit 404, and the sheet type determination unit 404 performs primary determination of determining the group of the sheet from which the image data is acquired.

In step S903, the estimation parameters of the convolution operation unit 403 and the sheet type determination unit 404 are set to the estimation parameters stored in the estimation parameter storage unit 405 corresponding to the group determined in step S902.

In step S904, the convolution operation is executed on the image data acquired in step S510 using the estimation parameters set in step S903 to extract the feature amount.

In step S905, the feature amount extracted in step S904 is input to the sheet type determination unit 404 to determine which sheet the measured sheet is in the group 1.

In step S906, it is determined whether the determination result in step S905 is the unique sheet type. If there is a plurality of candidates, and the sheet type is not uniquely determined (NO in step S906), the processing returns to step S903 and is performed again. Whereas, if the sheet type is uniquely determined (YES in step S906), the processing is terminated.

A description will be provided of a method of determining the number of groups and the sheet types included in each group according to the present exemplary embodiment.

Initially, the estimation parameters are generated which are set to the convolution operation unit 403 and the sheet type determination unit 404 and are used to uniquely determine the sheet type from among all sheets which are determination targets through one determination.

Next, new image data of each sheet which is not used in generation of the estimation parameter is input to the convolution operation unit 403, and "a correct answer for sheet type" and "a sheet type output with a probability of 1% or more" are classified into the same group based on the probability of being each sheet type output by the sheet type determination unit 404. For example, in a case where it is determined that the probability of being the matte paper is 3% if the correct answer for the sheet type is the plain paper, the plain paper and the matte paper are classified into the same recording medium group.

A method of generating the estimation parameter according to the present exemplary embodiment will be described. The estimation parameter is generated in a manner that the sheet type identification unit 101 and the learning unit 102 perform learning by using backpropagation with a data set generated by a method described below as input data.

A method of generating a data set will be described below.

Figure 10:
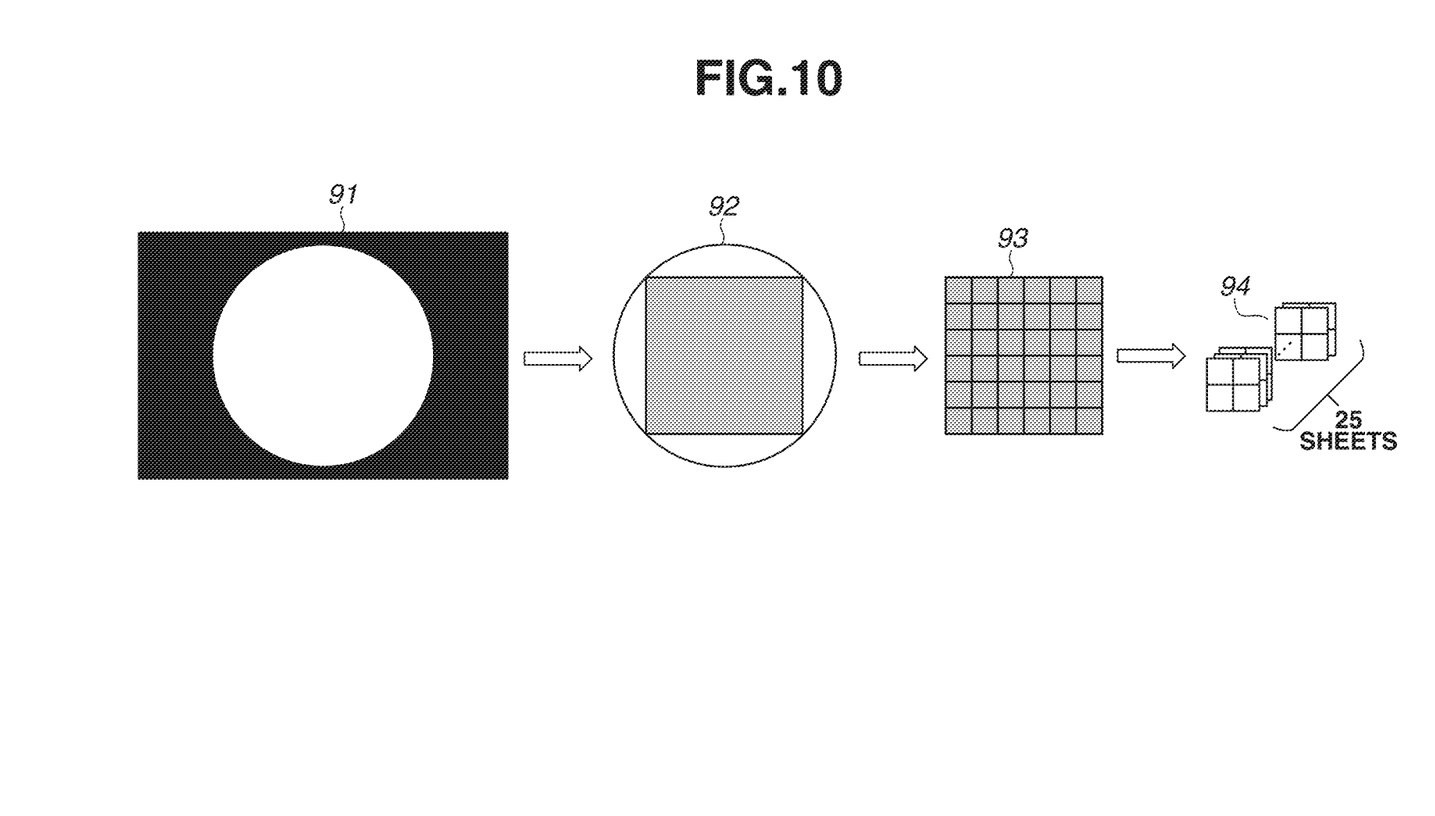
FIG. 10 illustrates preprocessing for image data according to the present exemplary embodiment.

FIG. 10 illustrates preprocessing for acquired image data. Image data 91 is captured under an exposure condition which is appropriate only for a part where light emitted by a light emitting element is reflected, so that blocked out shadows occur except in an appropriate exposure portion 92 in the center. Thus, only the appropriate exposure portion 92 is cut out into a perfect circle, and a square 93 which is inscribed in the cut out perfect circle is further cut out.

The square 93 inscribed in the cut out perfect circle is divided into six equal parts in vertically and horizontally, and a square including four cells on an upper left is cut out.

Next, squares including four cells are cut out while a position at which a square is to be cut out is slid by one cell at a time in the horizontal direction, and if the square currently cut out reaches a right end, the position at which a square is to be cut out returns to the left end and is slid by one cell downward. Squares are cut out again while the position at which a square is to be cut out is slid by one cell at a time in the horizontal direction, and thus 25 pieces of image data 94 for generating the estimation parameter are generated from one piece of image data.

According to the present exemplary embodiment, a monochromatic image having a size of 186×186 pixels is used as the image data for generating the parameter. The image data for generating the parameter is generated for each sheet type to be the determination target using the above-described method, the determination result of the correct answer is labeled, and the data set is generated.

As for the estimation parameter used in step S602, it is only required that determination as to which group the measured sheet belongs to can be made, and here, recognizing whether the asperities are many or few is sufficient. Thus, in order to learn a difference in the feature amounts between the groups, the image data of the sheets in both groups generated by the above-described method are used for learning. The learning is executed using the image data of the sheets in both groups as input data and the groups (the group 1 and the group 2) as the correct answer labels. The parameter acquired through the learning is the estimation parameter to be used in step S602.

The estimation parameter set in step S604 is required to determine which sheet the measured sheet is in the group 1. In order to learn the difference in the feature amounts among the sheets in the group 1, only the image data of the group 1 is used for the learning. The learning is executed using the image data of the group 1 as the input data and the sheet types in the group 1 (the plain paper, the matte paper, and the glossy paper 1) as the correct answer labels. The parameter acquired through this learning is the estimation parameter to be used in step S604. The estimation parameter set in step S608 is also generated by a similar method using the image data of the group 2.

The learning is executed in advance as described above, and the estimation parameter is determined. The estimation parameter is stored in the estimation parameter storage unit 405 as an initial value. In a case where a setting is made so that a user updates the estimation parameter, additional learning is executed in step S560 in FIG. 6, and the estimation parameter is updated.

As described above, a type of a sheet is determined based on a captured image of the sheet, and thus a detailed type of the sheet can be determined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-181047, filed Oct. 29, 2020, and No. 2021-132029, filed Aug. 13, 2021, which are hereby incorporated by reference herein in their entirety.

What is claimed is:

1. A recording medium determination apparatus comprising:
   at least one processor; and
   at least one memory in communication with the at least one processor and having stored thereon instructions which, when executed by the at least one processor, cause the recording medium determination apparatus to act as:
   an image data acquisition unit configured to acquire image data obtained by capturing an image of a predetermined area in a recording medium;

a first extraction unit configured to extract a first feature amount by processing the image data using a first parameter;
a second extraction unit configured to extract a second feature amount by processing the image data using a second parameter different from the first parameter; and
a determination unit configured to determine a type of the recording medium based on the first feature amount and the second feature amount,
wherein a pixel having a maximum value is extracted from neighboring pixels from the predetermined area of the image captured in the recording medium to extract the first feature amount and the second feature amount,
wherein the determination unit includes a first determination unit and a second determination unit,
wherein the first determination unit determines, based on the first feature amount extracted by the first extraction unit, which group the recording medium belongs to among groups into which a plurality of types of recording media is classified based on a feature of image data,
wherein the second determination unit determines, based on the second feature amount extracted by the second extraction unit, which type the recording medium is among types of recording media belonging to the group determined by the first determination unit, and
wherein the first parameter is generated by performing learning in such a manner that the group determined by the first determination unit matches a group indicated by a correct answer label when image data is input to the first extraction unit using image data of a recording medium of a type belonging to each group as input data and a group corresponding to the input data as the correct answer label.

2. The recording medium determination apparatus according to claim 1, wherein the at least one processor further acts as a third extraction unit configured to extract a third feature amount by processing the image data using a third parameter which is different from the first parameter and the second parameter,
wherein the determination unit includes a third determination unit, and
wherein, in a case where candidates for the type of the recording medium is not uniquely determined in type by the second determination unit, the third determination unit determines which type the recording medium is among the candidates determined by the second determination unit based on the third feature amount.

3. The recording medium determination apparatus according to claim 1, wherein the at least one processor further acts as a selection unit configured to select the second parameter to be used by the second extraction unit from among a plurality of parameters set in correspondence with each group, based on the group determined by the first determination unit.

4. The recording medium determination apparatus according to claim 1, wherein the second parameter is generated by performing learning in such a manner that the type of the recording medium determined by the second determination unit matches a type of a recording medium indicated by a correct answer label when image data is input to the second extraction unit using image data of recording medium of a type belonging to a predetermined group as input data and a type of a recording medium corresponding to the input data as the correct answer label.

5. The recording medium determination apparatus according to claim 1, wherein the first extraction unit and the second extraction unit each extract a feature amount by performing convolution operation processing on the image data.

6. The recording medium determination apparatus according to claim 1, wherein the determination unit includes a neural network.

7. The recording medium determination apparatus according to claim 1, further comprising a recording unit configured to perform recording by ejecting ink to the recording medium,
wherein a parameter for an ejection amount of the ink in recording is set based on the type of the recording medium determined by the second determination unit.

8. The recording medium determination apparatus according to claim 1, further comprising an image sensor,
wherein the image data acquisition unit acquires image data obtained by capturing an image of the predetermined area in the recording medium using the image sensor.

9. A method of determining a type of a recording medium, the method comprising:
capturing an image of a predetermined area in a recording medium;
acquiring the captured image data;
extracting a first feature amount from the image data using a first parameter by a first extraction unit;
extracting a second feature amount from the image data using a second parameter different from the first parameter by a second extraction unit; and
determining a type of the recording medium based on the first feature amount and the second feature amount,
wherein a pixel having a maximum value is extracted from neighboring pixels from the predetermined area of the image captured in the recording medium to extract the first feature amount and the second feature amount,
wherein the determining includes a first determining and a second determining,
wherein in the first determining, determines, based on the first feature amount, which group the recording medium belongs to among groups into which a plurality of types of recording media is classified based on a feature of image data,
wherein in the second determining, determines, based on the second feature amount, which type the recording medium is among types of recording media belonging to the group determined in the first determining, and
wherein the first parameter is generated by performing learning in such a manner that the group determined in the first determining matches a group indicated by a correct answer label when image data is input to the first extraction unit using image data of a recording medium of a type belonging to each group as input data and a group corresponding to the input data as the correct answer label.

10. A recording medium determination apparatus comprising:
at least one processor; and
at least one memory in communication with the at least one processor and having stored thereon instructions which, when executed by the at least one processor, cause the recording medium determination apparatus to act as:
an image data acquisition unit configured to acquire image data obtained by capturing an image of a predetermined area in a recording medium;

a first extraction unit configured to extract a first feature amount by processing the image data using a first parameter;

a second extraction unit configured to extract a second feature amount by processing the image data using a second parameter different from the first parameter; and a determination unit configured to determine a type of the recording medium based on the first feature amount and the second feature amount, wherein the determination unit includes a first determination unit and a second determination unit, wherein the first determination unit determines, based on the first feature amount extracted by the first extraction unit, which group the recording medium belongs to among groups into which a plurality of types of recording media is classified based on a feature of image data, and wherein the second determination unit determines, based on the second feature amount extracted by the second extraction unit, which type the recording medium is among types of recording media belonging to the group determined by the first determination unit, wherein the at least one processor further acts as a selection unit configured to select the second parameter to be used by the second extraction unit from among a plurality of parameters set in correspondence with each group, based on the group determined by the first determination unit.

* * * * *